United States Patent
Yang

[11] Patent Number: 5,452,029
[45] Date of Patent: Sep. 19, 1995

[54] EYEGLASS FRAME ASSEMBLY

[76] Inventor: Tien Yang, No. 689-97, Hsiao-Tung Rd., Yung-Kang City, Tainan Hsien, Taiwan

[21] Appl. No.: 287,228

[22] Filed: Aug. 8, 1994

[51] Int. Cl.$^6$ .............................................. G02C 5/00
[52] U.S. Cl. ..................... 351/140; 351/115; 2/450
[58] Field of Search ............... 351/140, 142, 149, 101, 351/115; 16/228; 2/450

[56] References Cited

U.S. PATENT DOCUMENTS 4,527,291  7/1985  Nussbickl ...................... 351/115 X Primary Examiner—William L. Sikes
Assistant Examiner—Huy Mai
Attorney, Agent, or Firm—Baker & Daniels

[57] ABSTRACT

An eyeglass frame assembly includes a lens frame body adapted to rest on the nose of the user and having two side portions, each of which has a generally circular horizontal positioning hole formed therethrough, and an engagement device provided in the positioning hole. Each of the positioning holes has two diametrically opposed extensions extending radially and outwardly therefrom. Each of two connectors is adapted to be coupled with the fastener device and includes an integral cylindrical connecting portion engaged within a corresponding one of the positioning holes, and an engagement device which engages a corresponding one of the engagement devices of the frame body so as to prevent rotation of the connecting portions of the connectors within the positioning holes of the frame body. Each of the connecting portions of the connectors is formed integrally with two diametrically opposed projections that protrude radially and outwardly therefrom. The engagement devices of the connectors can be forced to disengage the engagement devices of the frame body.

3 Claims, 7 Drawing Sheets

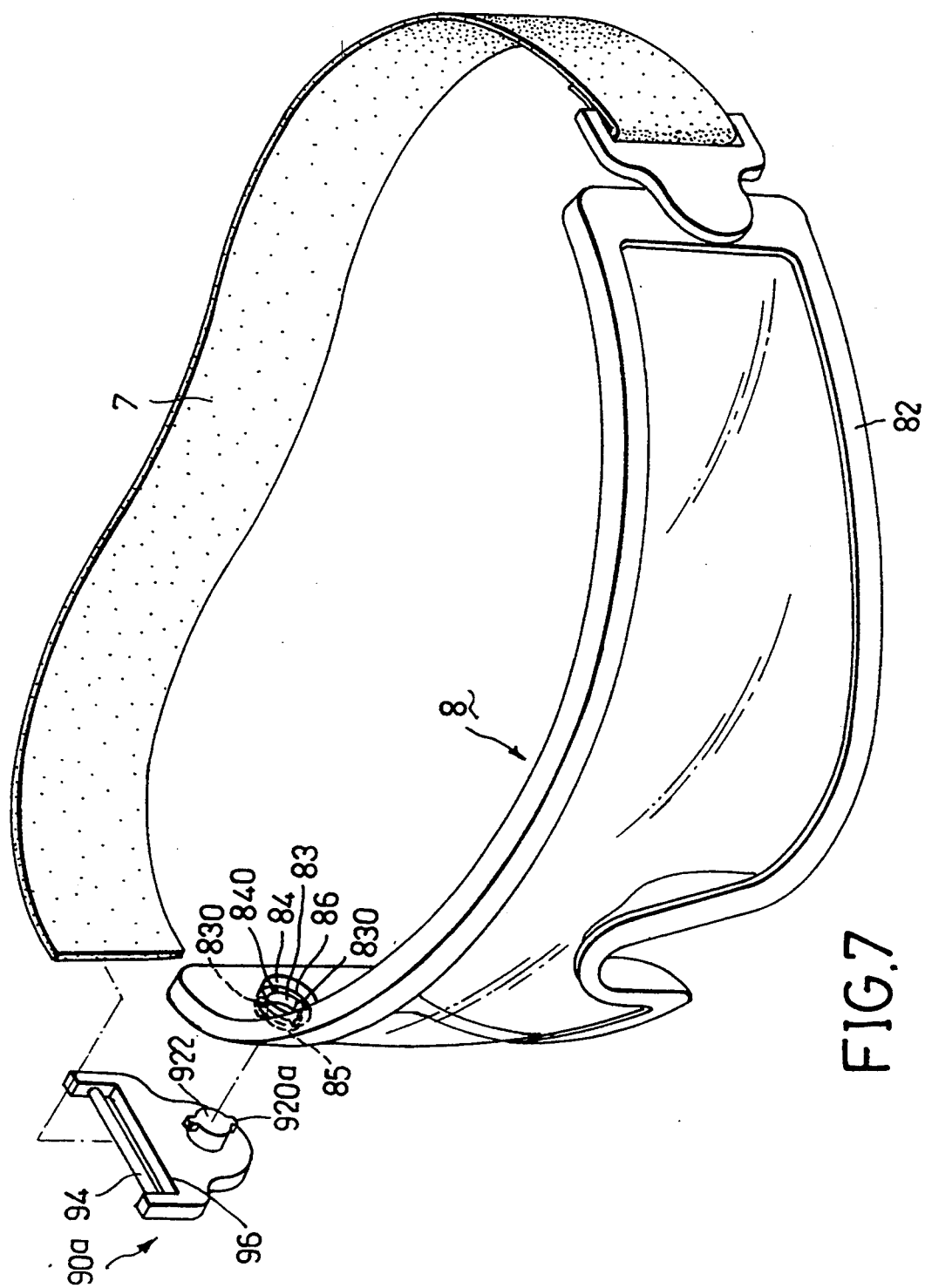

EYEGLASS FRAME ASSEMBLY

BACKGROUND OF THE INVENTION

1. Field of the Invention

This invention relates to an eyeglass frame assembly, more particularly to an eyeglass frame assembly which can be coupled with a head strap or with a pair of bows by means of two connectors that can be rotated relative to the eyeglass frame.

2. Description of the Related Art

Referring to FIG. 1, a conventional pair of eyeglasses includes an eyeglass unit 1 and a pair of bows 2. The eyeglass unit 1 has an eyeglass frame 10 having a lens 11 disposed therewithin, and two connectors 12 which project respectively from two end edges of the eyeglass frame 10 and which are formed integrally with the eyeglass frame 10. Each of the connectors 12 has a vertical threaded hole 120 extending therethrough. Each of the bows 2 has an earpiece 20 formed at the rear distal end thereof and a pivot member 21 formed at the front distal end thereof. Each of the pivot members 21 has two vertical aligned holes 210 and a bolt 22 which extends threadably through one of the vertical aligned holes 210, the vertical threaded hole 120 of the eyeglass frame 10, and through another one of the vertical aligned holes 210 so as to secure threadably the bows 2 on the eyeglass frame 10.

Since the connectors 12 and the eyeglass frame 10 are formed integrally, the connectors 12 can only be used for connecting the bows 2. Moreover, since the positions of the bows 2 are fixed after the bows 2 have been pivoted on the connectors 12, the conventional eyeglasses cannot be adjusted to provide comfort to the wearer who suffers from poor eyesight.

SUMMARY OF THE INVENTION

Therefore, the main objective of this invention is to provide an eyeglass frame assembly which has a fastener device, such as a pair of bows or a head strap, that can be adjusted to suit the needs of the wearer.

According to this invention, an eyeglass frame assembly includes a lens frame body adapted to rest on the nose of the user and having two side portions, each of which has a generally circular horizontal positioning hole formed therethrough, and an engagement device provided in the positioning hole. Each of the positioning holes has two diametrically opposed extensions extending radially and outwardly therefrom. Each of the connectors is adapted to be coupled with a fastener device for fastening the lens frame body to the head of the user and includes an integral cylindrical connecting portion engaged within a corresponding one of the positioning holes, and an engagement device which engages a corresponding one of the engagement devices of the frame body so as to prevent rotation of the connecting portions of the connectors within the positioning holes of the frame body. Each of the connecting portions of the connectors is formed integrally with two diametrically opposed projections that protrude radially and outwardly therefrom. The engagement devices of the connectors can be forced to disengage the engagement devices of the frame body so that the connectors are removed from the frame body when the connecting portions of the connectors are rotated within the positioning holes of the frame body to a position in which each of the projections of the connectors registers with a corresponding one of the extensions of the positioning holes of the frame body.

In one embodiment of the present invention, each of the positioning holes has a large-diameter section and a small-diameter section which is adjacent to the large-diameter section. The frame body has a front surface in which the small-diameter sections are formed, and a rear surface in which the large-diameter sections are formed. The small-diameter section and the large-diameter section of each of the positioning holes define therebetween a shoulder in the frame body. Each of the engagement devices of the frame body includes a cavity formed in a corresponding one of the shoulders. Each of the engagement devices of the connectors includes a nose projecting from a corresponding one of the projections of the connecting portions to engage within a corresponding one of the cavities of the frame body.

In another embodiment of the present invention, each of the positioning holes has a large-diameter section and a small-diameter section which is adjacent to the large-diameter section. The frame body has a front surface in which the small-diameter sections are formed, and a rear surface in which the large-diameter sections are formed. The small-diameter section and the large-diameter section of each of the positioning holes define therebetween a shoulder in the frame body. Each of the engagement devices of the frame body includes several circumferentially equidistant cavities formed in a corresponding one of the shoulders. Each of the engagement devices of the connectors includes a nose projecting from a corresponding one of the projections of the connecting portions to engage within a selected one of the cavities of the frame body. The positions of the connectors relative to the frame body can be adjusted so as to change the position of the fastener device relative to the frame body.

BRIEF DESCRIPTION OF THE DRAWINGS

Other features and advantages of the present invention will become apparent in the following detailed description of the preferred embodiments, with reference to the accompanying drawings, in which:

FIG. 7 is a exploded view of the eyeglass frame assembly according to a fourth embodiment of the present invention.

DETAILED DESCRIPTION OF THE PREFERRED EMBODIMENTS

Figure 1:
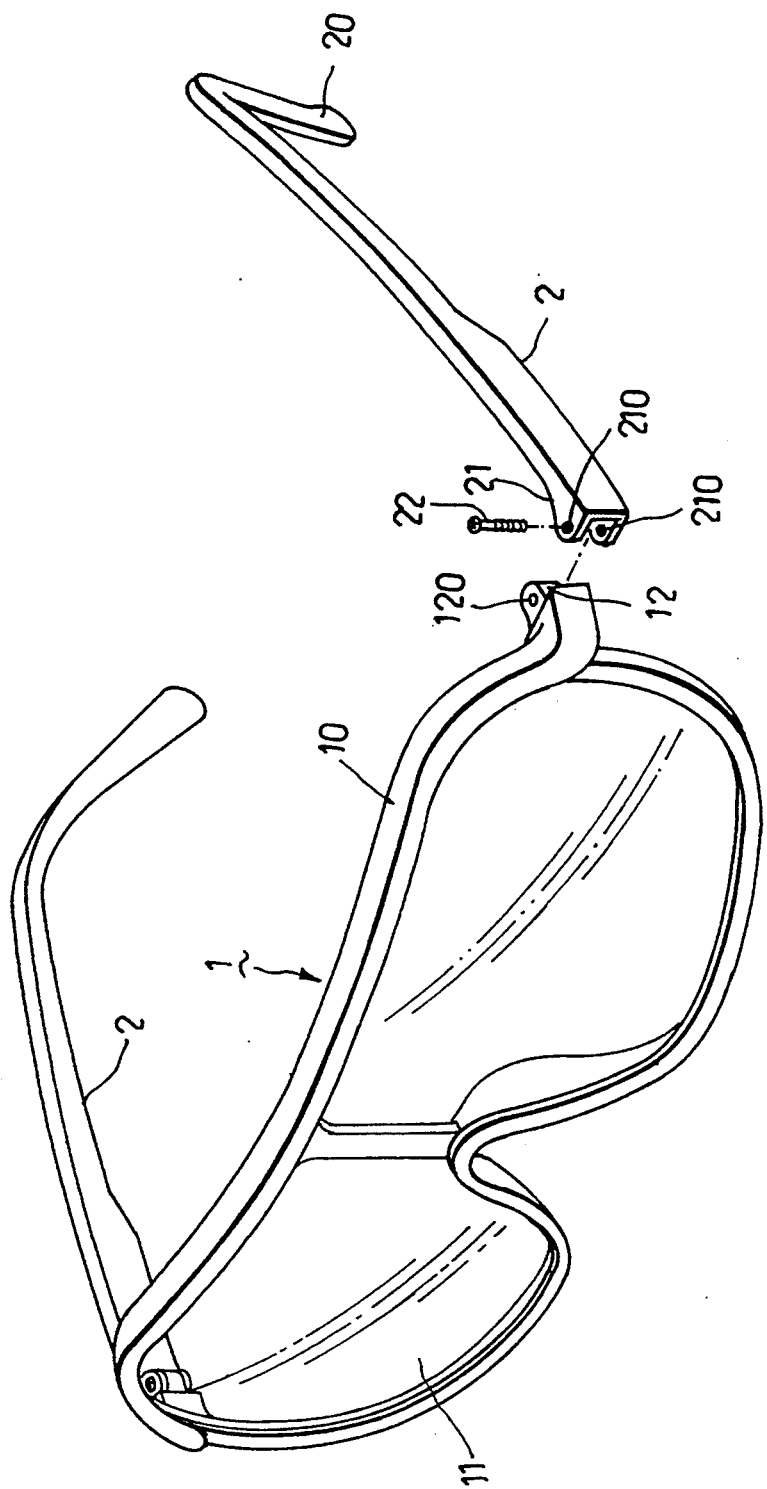
FIG. 1 is an exploded view of a conventional pair of eyeglasses.

Before the present invention is described in greater detail, it should be noted that like elements are indicated by the same reference numerals throughout the disclosure.

Figure 2:
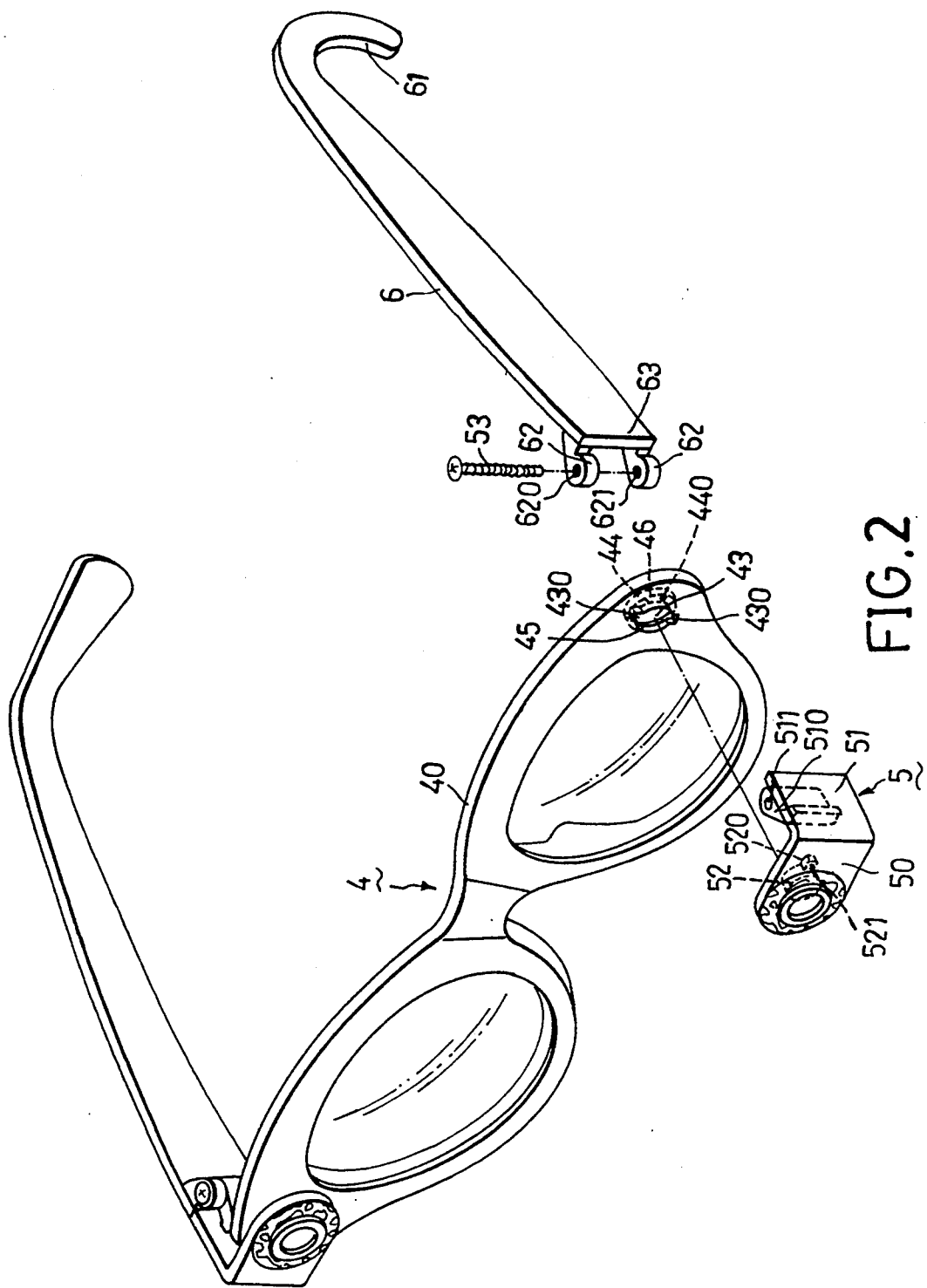
FIG. 2 is an exploded view of an eyeglass frame assembly according to a first embodiment of the present invention.
Figure 3:
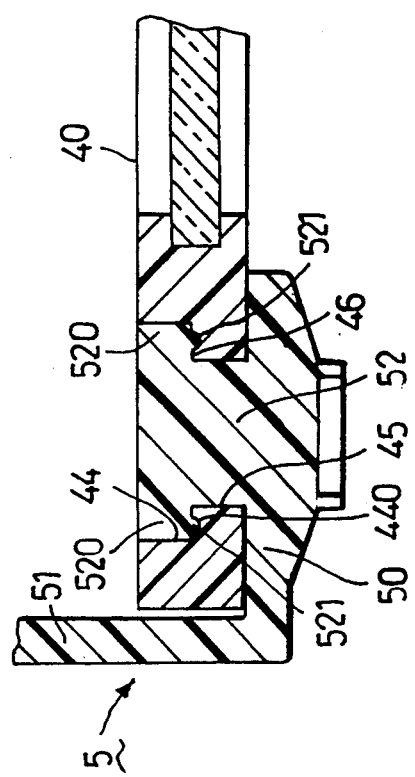
FIG. 3 is a sectional view of the eyeglass frame assembly according to the first embodiment of the present invention.

Referring to FIGS. 2 and 3, the first preferred embodiment of an eyeglass frame assembly 4 according to this invention includes a lens frame body 40 which is adapted to rest on the nose of the user and which has two side portions. Each of the side portions has a generally circular horizontal positioning hole 43 formed therethrough, and an engagement device, such as a cavity 440, provided in the positioning hole 43. Each of the positioning holes 43 has two diametrically opposed extensions 430 extending radially and outwardly therefrom, a large-diameter section 44 and a small-diameter section 45 which is adjacent to the large-diameter section 44 and which has a diameter smaller than the large-diameter section 44. The frame body 40 has a front surface in which the small-diameter sections 45 are formed, and a rear surface in which the large-diameter sections 44 are formed. The small-diameter section 45 and the large-diameter section 44 of each of the positioning holes 43 define therebetween a shoulder 46 in the frame body 40. Each of the cavities 440 is formed in a corresponding one of the shoulders 46.

Each of two connectors 5 includes an integral cylindrical connecting portion 52 mounted on an inner wall of a front side 50 of the connector 5 and engaged within a corresponding one of the positioning holes 43, and a retaining element 510 which is mounted on an inner wall of a lateral side 51 of the connector 5 and which has a vertical threaded hole 511 extending therethrough. Each of the integral cylindrical connecting portions 52 of the connectors 5 is formed integrally with two diametrically opposed projections 520 which protrude radially and outwardly therefrom, and an engagement device, such as a nose 521, which engages a corresponding one of the cavities 440 of the frame body 40 so as to prevent rotation of the connectors 5 within the positioning holes 43 of the frame body 40. The noses 521 of the connectors 5 can be forced to disengage the cavities 440 of the frame body 40 so that the connectors 5 can be removed from the frame body 40 when the connectors 5 are rotated within the positioning holes 43 of the frame body 40 to a position in which the projections 520 of the connectors 5 register with a corresponding one of the extensions 430 of the positioning holes 43 of the frame body 40.

Each of a pair of bows 6 has a downwardly curved end portion 61 and a connecting end portion 63 with two parallel locking ears 62 that are mounted respectively thereon. The parallel locking ears 62 have two threaded holes 620, 621 which are aligned with each other and with the vertical threaded hole 511 of the retaining element 510.

Each of two bolts 53 extends threadably and respectively through the threaded hole 620 of one of the locking ears 62, the vertical threaded hole 511 of the retaining element 510, and through the threaded hole 621 of another one of the locking ears 62 so as to fasten the bows 6 on the connectors 5.

Figure 4:
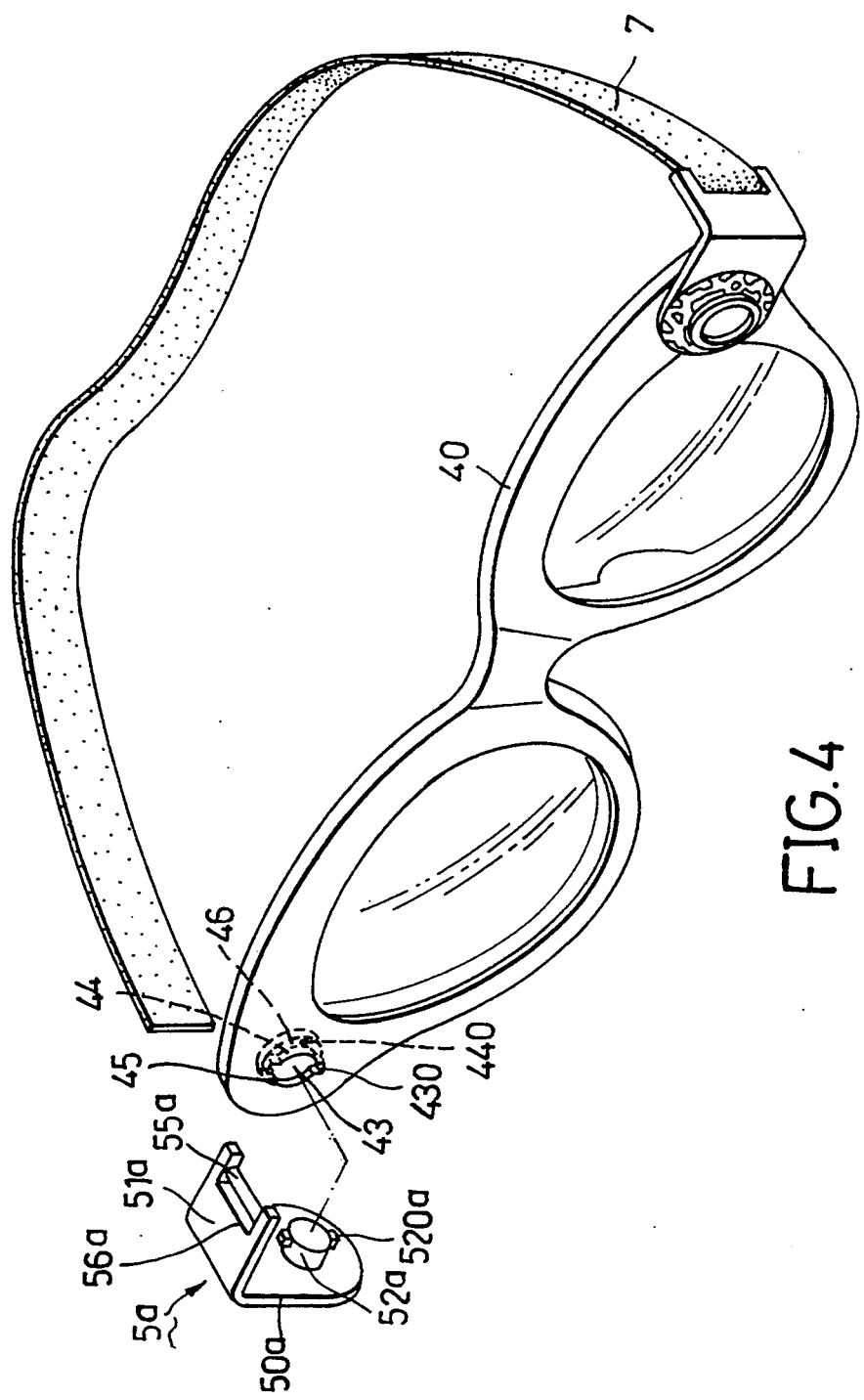
FIG. 4 is an exploded view of the eyeglass frame assembly according to a second embodiment of the present invention.

Referring to FIG. 4, the connectors 5 and the bows 6 of the eyeglass frame assembly of the first preferred embodiment can be replaced by two connectors 5a and a head strap 7 to form the second preferred embodiment of this invention. Each of the connectors 5a includes an integral cylindrical connecting portion 52a which is mounted on an inner wall of a front side 50a of the connector 5a and which is engaged within a corresponding one of the positioning holes 43. A notch 56a is formed at a lateral side 51a of the connector 5a. A pin 55a is disposed within the notch 56a so that one end of the head strap 7 can be fastened within the notch 56a and the pin 55a. A nose (not shown) engages a corresponding one of the cavities 440 of the frame body 40 so as to prevent rotation of the connectors 5a within the positioning holes 43 of the frame body 40. The integral cylindrical connecting portion 52a of each of the connectors 5a is formed integrally with two diametrically opposed projections 520a which protrude radially and outwardly therefrom. The noses (not shown) of the connectors 5a can be forced to disengage the cavities 440 of the frame body 40 so that the connectors 5a can be removed from the frame body 40 when the connectors 5a are rotated within the positioning holes 43 of the frame body 40 to a position in which the projections 520a of the connectors 5a register with a corresponding one of the extensions 430 of the positioning holes 43 of the frame body 40.

Figure 5:
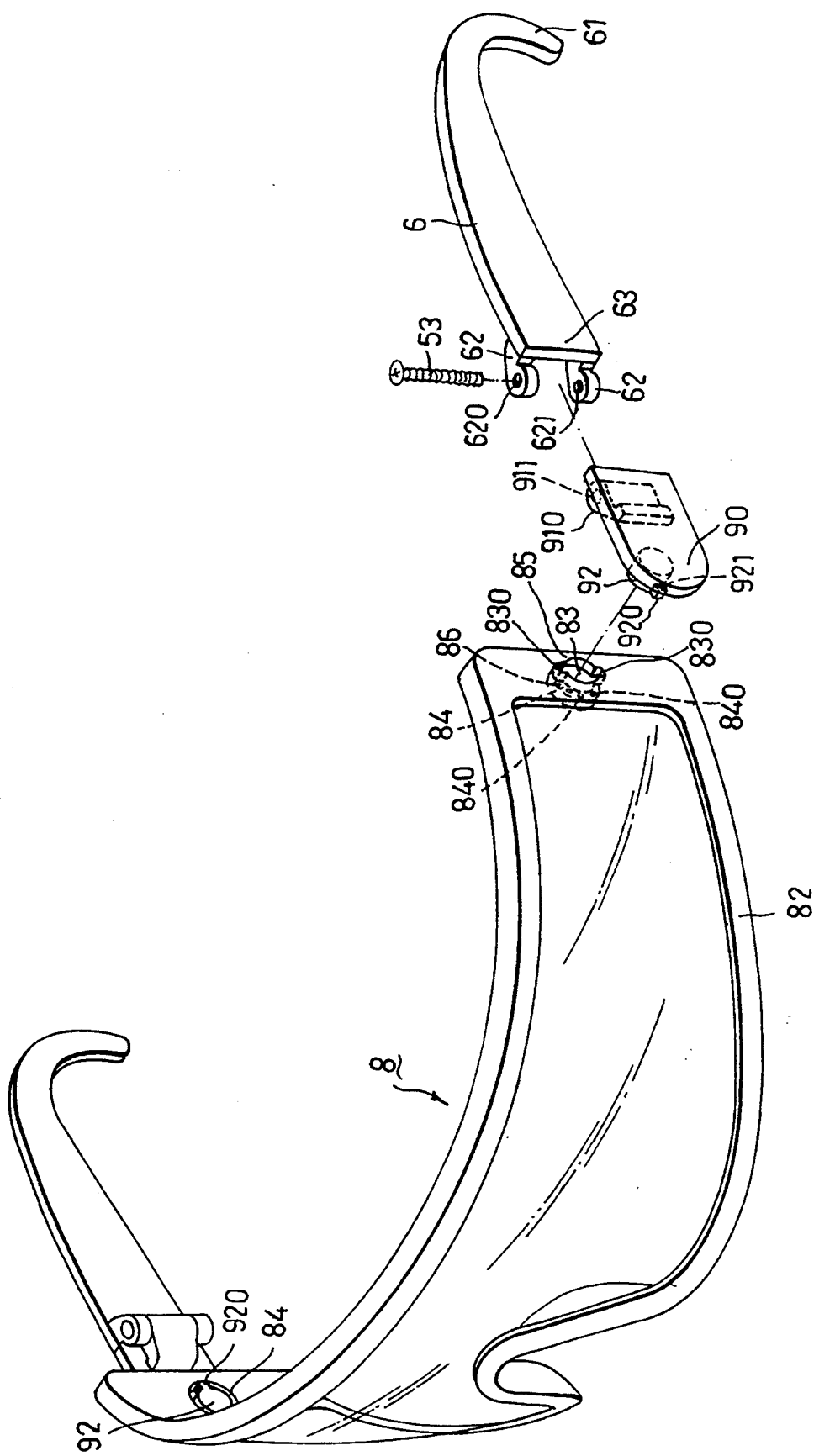
FIG. 5 is an exploded view of the eyeglass frame assembly according to a third embodiment of the present invention.
Figure 6:
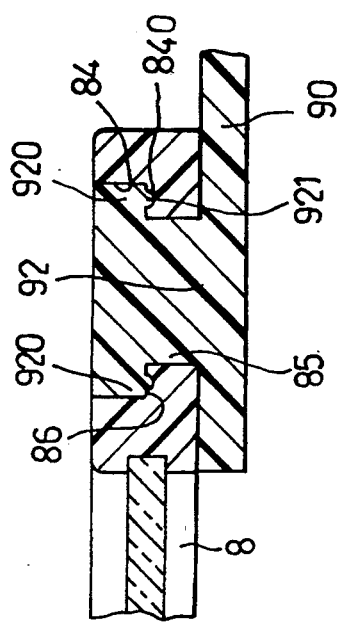
FIG. 6 is a sectional view of the eyeglass frame assembly according to the third embodiment of the present invention.

Referring to FIGS. 5 and 6, the third preferred embodiment of an eyeglass frame assembly 8 according to this invention includes a lens frame body 82 which is adapted to rest on the nose of the user and which has two side portions. Each of the side portions has a generally circular horizontal positioning hole 83 formed therethrough, and an engagement device or several circumferentially equidistant cavities 840 provided in the positioning hole 83. Each of the positioning holes 83 has two diametrically opposed extensions 830 extending radially and outwardly therefrom, a large-diameter section 84 and a small-diameter section 85 which is adjacent to the large-diameter section 84 and which has a diameter smaller than the large-diameter section 84. The frame body 82 has a curved front surface in which the small-diameter sections 85 are formed, and a rear surface in which the large-diameter sections 84 are formed. The small-diameter section 85 and the large-diameter section 84 of each of the positioning holes 83 define therebetween a shoulder 86 in the frame body 82. Each of the cavities 840 is formed in a corresponding one of the shoulders 86.

Each of two connectors 90 includes an integral cylindrical connecting portion 92 which is mounted on an inner wall of the connectors 90 and which is engaged within a corresponding one of the positioning holes 83, and a retaining element 910 mounted on an inner wall of the connector 90 and having a vertical threaded hole 911 extending therethrough. The integral cylindrical connecting portion 92 of each of the connectors 90 is formed integrally with two diametrically opposed projections 920 that protrude radially and outwardly therefrom, and an engagement device or nose 921 which engages a corresponding one of the cavities 840 of the frame body 82 so as to prevent rotation of the connectors 90 within the positioning holes 83 of the frame body 82. The nose 921 of the connectors 90 can be forced to disengage the cavities 840 (see FIG. 6) of the frame body 82 so that the connectors 90 can be removed from the frame body 82 when the connectors 90 are rotated within the positioning holes 83 of the frame body 82 to a position in which the projections 920 of the connectors 90 register with the extensions 830 of the positioning holes 83 of the frame body 82.

Each of a pair of bows 6 has a downwardly curved end portion 61 and a connecting end portion 63 with two parallel locking ears 62 that are mounted respectively thereon. The parallel locking ears 62 have two threaded holes 620, 621 which are aligned with each other and with the vertical threaded hole 911 of the retaining element 910.

Each of two bolts 53 extends threadably and respectively through the threaded hole 620 of one of the locking ears 62, the vertical threaded hole 511 of the retaining element 510, and through the threaded hole 621 of another one of the locking ears 62 so as to retain the bows 6 on the connectors 90.

Referring to FIG. 7, the connectors 90 and the bows 6 of the eyeglass frame assembly of the third preferred embodiment can be replaced by two connectors 90a and a head strap 7 to form the fourth preferred embodiment of this invention. Each of the connectors 90a includes an integral cylindrical connecting portion 922 which is mounted on an inner wall of the connector 90a and which is engaged within a corresponding one of the positioning holes 83. A notch 96 is formed at one end of the connector 90a. A pin 94 is disposed within the notch 96 so that one end of the head strap 7 can be fastened between the notch 96 and the pin 94. A nose (not shown) engages a corresponding one of the cavities 840 of the frame body 82 so as to prevent rotation of the connectors 90a within the positioning holes 83 of the frame body 82. Each of the connectors 90a is formed integrally with two diametrically opposed projections 920a that protrude radially and outwardly therefrom. The noses 921 of the connectors 90a can be forced to disengage the cavities 840 of the frame body 82 so that the connectors 90a can be removed from the frame body 82 when the connecting portions 922 of the connectors 90a are rotated within the positioning holes 83 of the frame body 82 to a position in which the projections 920a of the connectors 90a register with a corresponding one of the extensions 830 of the positioning holes 83 of the frame body 82.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An eyeglass frame assembly adapted to be coupled with a fastener device which fastens said frame assembly to the head of a user, said frame assembly comprising:

a lens frame body adapted to rest on the nose of the user and having two side portions, each of which has a generally circular horizontal positioning hole formed therethrough, and an engagement device provided in said positioning hole, each of said positioning holes having two diametrically opposed extensions extending radially and outwardly therefrom; and two connectors, each of which is adapted to be coupled with the fastener device and includes an integral cylindrical connecting portion engaged within a corresponding one of said positioning holes, and an engagement device engaging a corresponding one of said engagement devices of said frame body so as to prevent rotation of said connecting portions of said connectors within said positioning holes of said frame body, each of said connecting portions of said connectors being formed integrally with two diametrically opposed projections protruding radially and outwardly therefrom, said engagement devices of said connectors being forcible to disengage said engagement devices of said frame body so that said connectors are removed from said frame body when said connecting portions of said connectors are rotated within said positioning holes of said frame body to a position in which each of said projections of said connectors registers with a corresponding one of said extensions of said positioning holes of said frame body.

2. An eyeglass frame assembly as claimed in claim 1, wherein each of said positioning holes has a large-diameter section and a small-diameter section which is adjacent to said large-diameter section, said frame body having a front surface in which said small-diameter sections are formed, and a rear surface in which said large-diameter sections are formed, said small-diameter section and said large-diameter section of each of said positioning holes defining therebetween a shoulder in said frame body, each of said engagement devices of said frame body including a cavity formed in a corresponding one of said shoulders, each of said engagement devices of said connectors including a nose projecting from a corresponding one of said projections of said connecting portions to engage within a corresponding one of said cavities of said frame body.

3. An eyeglass frame assembly as claimed in claim 1, wherein each of said positioning holes has a large-diameter section and a small-diameter section which is adjacent to said large-diameter section, said frame body having a front surface in which said small-diameter sections are formed, and a rear surface in which said large-diameter sections are formed, said small-diameter section and said large-diameter section of each of said positioning holes defining therebetween a shoulder in said frame body, each of said engagement devices of said frame body including several circumferentially equidistant cavities formed in a corresponding one of said shoulders, each of said engagement devices of said connectors including a nose projecting from a corresponding one of said projections of said connecting portions to engage within a selected one of said cavities of said frame body, whereby, positions of said connectors relative to said frame body can be adjusted so as to change position of said fastener device relative to said frame body.

* * * * *